US008855903B2

(12) United States Patent
Chiu (10) Patent No.: US 8,855,903 B2
(45) Date of Patent: Oct. 7, 2014

(54) ACTIVE TRAFFIC AND DEMAND MANAGEMENT SYSTEM (71) Applicant: The Arizona Board of Regents on behalf of the University of Arizona, Tucson, AZ (US)

(72) Inventor: Yi-Chang Chiu, Tucson, AZ (US)

(73) Assignees: The Arizona Board of Regents on Behalf of the University of Arizona, Tucson, AZ (US); The University of Arizona, Tech Transfer Arizona, Tucson, AZ (US)

( * ) Notice: Subject to any disclaimer, the term of this patent is extended or adjusted under 35 U.S.C. 154(b) by 0 days.

(21) Appl. No.: 14/256,756

(22) Filed: Apr. 18, 2014

(65) Prior Publication Data

US 2014/0229249 A1 Aug. 14, 2014

Related U.S. Application Data (62) Division of application No. 13/404,271, filed on Feb. 24, 2012, now Pat. No. 8,744,734.

(60) Provisional application No. 61/464,441, filed on Mar. 4, 2011.

(51) Int. Cl.
*G06F 19/00* (2011.01)
*G06Q 30/02* (2012.01)
*G01C 21/34* (2006.01)
*G08G 1/09* (2006.01)

(52) U.S. Cl.
CPC .............. *G08G 1/09* (2013.01); *G06Q 30/0207* (2013.01); *G01C 21/3492* (2013.01); *Y10S 430/137* (2013.01)
USPC ............. 701/117; 701/25; 701/410; 701/420; 701/421; 705/4; 705/6; 705/14.25; 705/301; 705/5; 430/439; 430/936; 430/441; 455/457

(58) Field of Classification Search
CPC .................. A45F 2200/0516; G01C 21/3492; G08G 1/0104; G08G 1/0129; G08G 1/096775; G08G 1/096811; G08G 1/096838; H04W 12/06
See application file for complete search history.

(56) References Cited

U.S. PATENT DOCUMENTS

2004/0049424 A1* 3/2004 Murray et al. .................. 705/14
2004/0158483 A1* 8/2004 Lecouturier ...................... 705/6

(Continued)

OTHER PUBLICATIONS

U.S. Appl. No. 13/404,271 Office Action dated Apr. 11, 2013.

*Primary Examiner* — Redhwan K Mawari
(74) *Attorney, Agent, or Firm* — Wilson Sonsini Goodrich & Rosati (57) ABSTRACT

Systems and methods for providing incentives for the public to travel during time windows and routes that help alleviate traffic congestion. The systems described herein include at least two components: a computer server software system that includes various algorithms and database sub-systems; and a mobile device application. Generally, a user may enter an origin, destination, and preferred time of travel for an intended trip into the mobile device application, which transmits the information to a remote server. The server computes a route for the trip and provides the user with available incentives for traveling the route at one or more departure time windows. The user's mobile device transmits GPS data to the server, which allows the server to verify whether the user has traveled the route during the specified time window. If so, the server then provides the incentive to the user via the user's mobile device or through email.

19 Claims, 8 Drawing Sheets

(56) References Cited

U.S. PATENT DOCUMENTS

| | | | |
|---|---|---|---|
| 2005/0039135 A1* | 2/2005 | Othmer et al. | 715/774 |
| 2007/0216521 A1* | 9/2007 | Guensler et al. | 340/439 |
| 2010/0131308 A1* | 5/2010 | Collopy et al. | 705/4 |
| 2010/0138246 A1* | 6/2010 | Carey et al. | 705/5 |
| 2011/0306366 A1* | 12/2011 | Trussel et al. | 455/457 |
| 2012/0226434 A1* | 9/2012 | Chiu | 701/117 |

\* cited by examiner

ACTIVE TRAFFIC AND DEMAND MANAGEMENT SYSTEM

CROSS-REFERENCE TO RELATED APPLICATIONS

This application is a division of U.S. application Ser. No. 13/404,271, filed Feb. 24, 2012, which claims priority to U.S. Provisional Application No. 61/464,441, filed Mar. 4, 2011, entitled "Active traffic and demand management system," which is hereby incorporated by reference in its entirety.

FIELD OF THE INVENTION

The present invention relates generally to systems and methods for traffic management, and more particularly, to computer-based systems and methods for actively managing traffic flow and reducing traffic congestion using route-specific historical and real-time travel time data and selectable user incentives.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Vehicular traffic congestion is a condition on traffic networks such as highways that occurs as use increases, and is characterized by slower speeds, longer trip times, increased vehicular queuing, and decreased fuel efficiency. The most common example of traffic congestion is the physical overcapacity use of roadways by vehicles. When traffic demand is great enough, the interaction between vehicles slows the speed of the traffic stream, congestion results. As demand exceeds the capacity of a roadway, extreme traffic congestion occurs. The condition resulting when vehicles are fully stopped for periods of time is colloquially known as a traffic jam.

Generally, traffic congestion occurs when a volume of travelers/commuters generates demand for roadway space greater than the available road capacity. This point may be termed saturation. A large percentage of traffic congestion is recurring and is attributed to the sheer rise of travel demand, and most of the rest of traffic congestion is attributed to traffic incidents, roadwork, and weather events.

Attempts at solving traffic congestion have included adding more highways, widening highways, adding various traffic controls, providing flexible work hours for employees, incentivizing carpooling, providing real-time traffic monitoring, and tolling highways. However, each of these proposed solutions have one or more defects in terms of their effectiveness, feasibility, cost, and the like.

BRIEF DESCRIPTION OF THE DRAWINGS

Exemplary embodiments are illustrated in the referenced figures. It is intended that the embodiments and figures disclosed herein are to be considered illustrative rather than restrictive.

DESCRIPTION OF THE INVENTION

One skilled in the art will recognize many methods, systems, and materials similar or equivalent to those described herein, which could be used in the practice of the present invention. Indeed, the present invention is in no way limited to the methods, systems, and materials described.

Embodiments of the present invention relate to systems and methods for providing incentives for the travelling public to travel user-selected routes at time windows that help alleviate traffic congestion. As used herein, traffic refers to the flux or passage of vehicles and/or pedestrians on roads, the commercial transport and exchange of goods, the movement of passengers or people, and the like. The systems described herein include at least two components: a computer server software system that includes various algorithms or modules and database sub-systems; and a mobile device application for execution on users' mobile devices (e.g., smartphones, etc.). Generally, a user may enter an origin, destination, and preferred time of travel of an intended trip into the mobile device application, which transmits the information to the remote server system ("system"). The server computes one or more routes for the trip and provides the user with available incentives for traveling the routes at one or more departure time windows. As an example, each time window or slot may be a 15 or 30-minute interval. In some embodiments, a greater incentive may be offered if the system wishes to encourage the user to depart at a time that would reduce congestion the most. The user's mobile device retrieves, for the intended trip, a plurality of time windows each having respective incentives from the system and the user then makes a reservation (or "commitment") for a route and a time window.

When the user actually makes the selected trip, the user's mobile device's global positioning system (GPS) function is activated and the mobile application compares the received GPS location information and the reserved route information to verify whether the user has traveled the selected route or at least a portion thereof during the specified time window. While this comparison is typically performed locally by the mobile application, the user also has an option to allow the application to transmit the GPS location information to the remote server to receive additional real-time alert and guidance in times of unexpected network disruptions such as incidents. After the travel has been verified, the server then credits the user's account with the previously agreed upon incentive. The system may notify the user of receipt of the incentive via the user's mobile device, by email, or the like.

The system includes algorithms that are operative to analyze the historical and real-time traffic data for the one or more routes and for each route, to predict the departing time windows that would result in the least amount of impact to the route's congestion. As can be appreciated, if departure time windows are deemed to be undesirable from a traffic congestion management standpoint, minimal or no incentives may be offered for those time windows on a particular route.

As discussed further below, exemplary incentives may include discounts to various vendors along the traveling corridor, origin, and/or destination, or online vendors, and may be based on users' personal profiles and interests. Exemplary incentives may also include certain credits that the user can use with other user accounts (e.g., credits to existing tolling accounts, reduced roadway tolling charges, credits to other merchant or airlines accounts, etc.) or within their system account. The credits may be accumulated and redeemed for various goods and services.

The system's algorithms are operative to dynamically adjust, for each route, the incentives allocation based on historical and real-time data as well as the existing reserved departures for each time window. As the number of users of the system becomes large, this dynamic adjustment feature becomes especially advantageous as it ensures there are no individual time windows and routes that become overloaded with reservations, which would increase traffic congestion during those time windows.

Figure 1A:
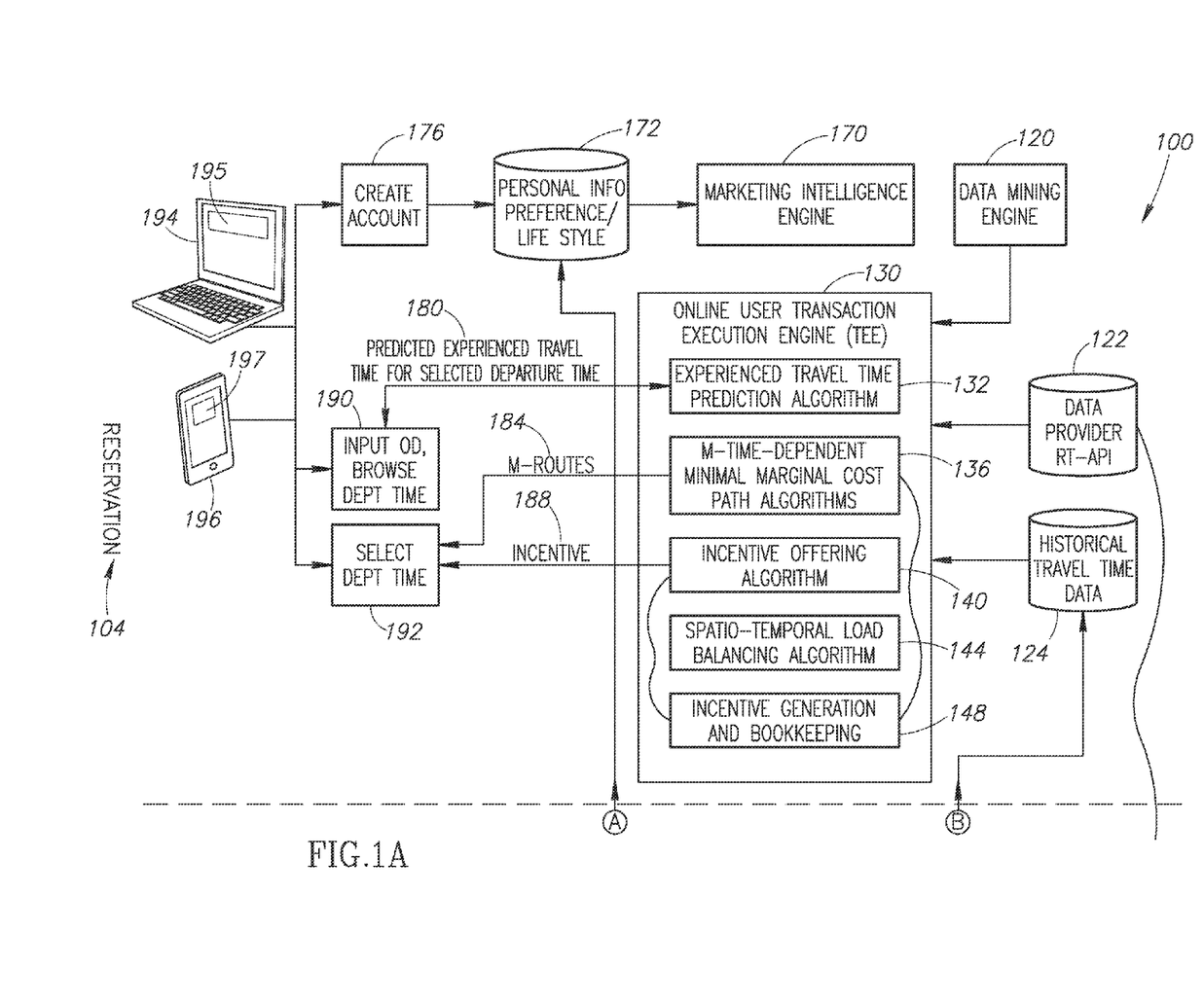
FIG. 1A depicts an upper portion of a block diagram illustrating a reservation process of an active traffic and demand management system according to an embodiment of the present invention.
Figure 1B:
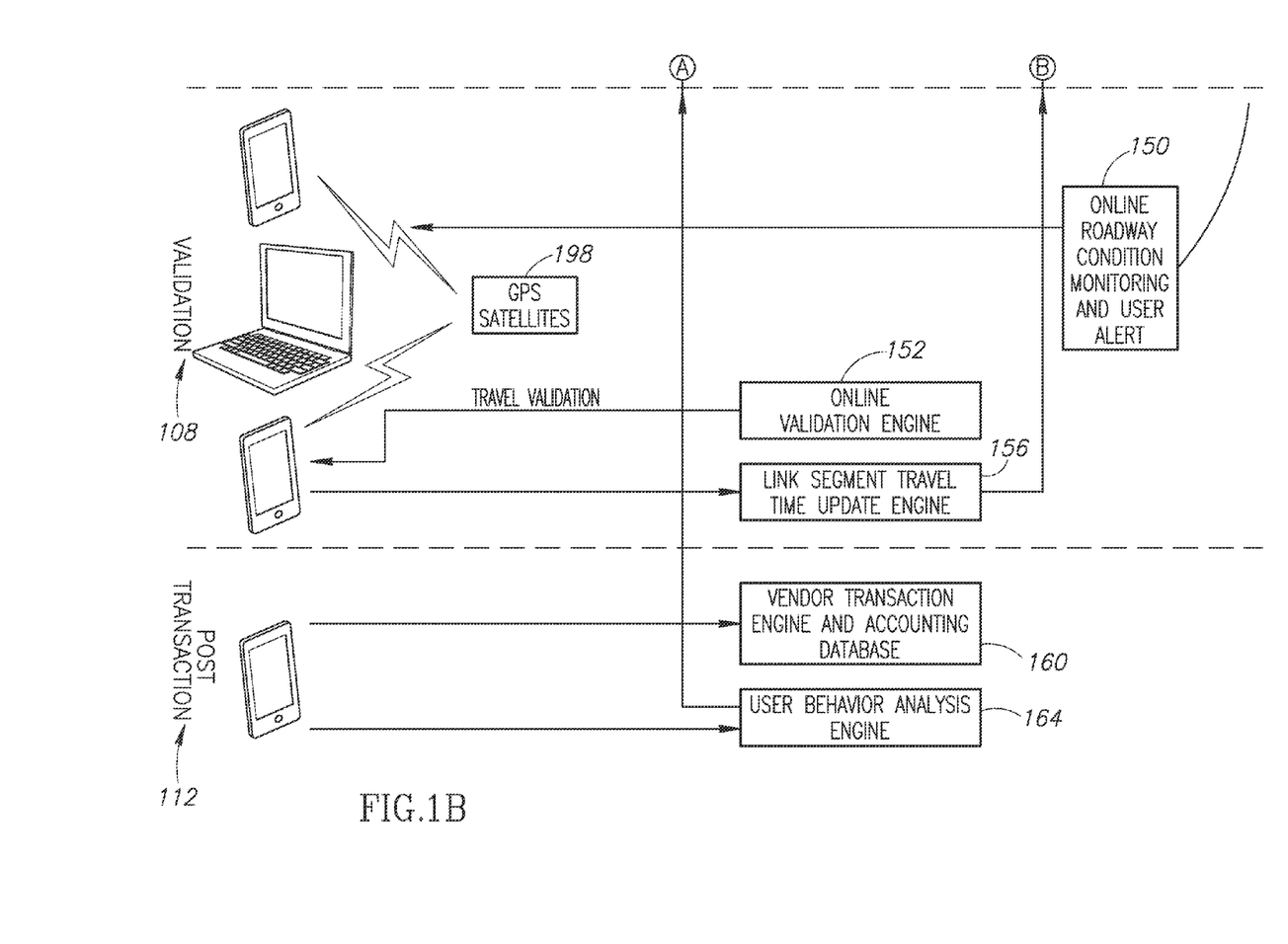
FIG. 1B depicts a lower portion of the block diagram illustrating a validation and post transaction process of the active traffic and demand management system shown in FIG. 1A.
Figure 5:
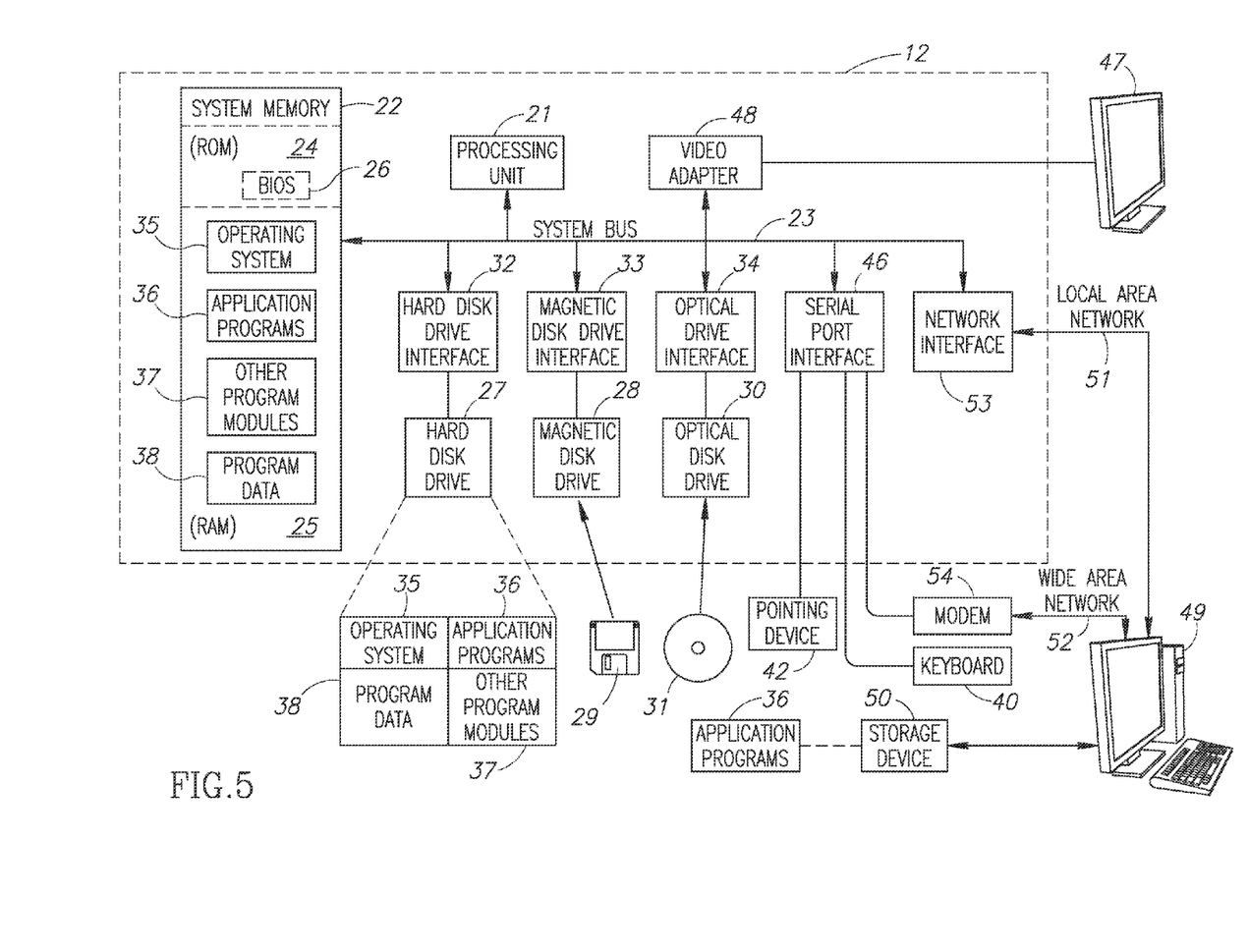
FIG. 5 depicts a diagram of a hardware environment and an operating environment in which one or more computing devices associated with the active traffic and demand management system and mobile devices of the present invention may be implemented.

FIGS. 1A and 1B depict a block diagram of an active traffic and demand management system 100 (or "system") according to an embodiment of the present invention. Specifically, FIG. 1A depicts an upper portion of the block diagram illustrating a reservation process 104 of the system 100, and FIG. 1B depicts a lower portion of the block diagram illustrating a validation process 108 and a post transaction process 112 of the system 100. A diagram of an exemplary hardware environment and an operating environment in which the system 100 may be implemented is shown in FIG. 5 and is described below.

As discussed above, the system 100 includes a mobile device application 197 (e.g., a smartphone application) operating on a user's mobile device 196 such as an iPhone®, Android®, or Windows Phone® platform phone, etc., and various algorithms and software modules executing on one or more remotely located server systems. Although not shown for clarity purposes, it should be appreciated that the software modules and other components of the system 100 may be operative to communicate with each other, as described below. The system 100 may also include a general web application 195 to allow users access the system via a conventional computer 194, such as a laptop, desktop, or tablet computer.

In operation, the mobile device application 197 of the system 100 allows a user to agree on a departure time window and route between the user's specified origin and destination location. This process begins by having the user enter into the application 197 the intended origin and destination location and preferred time of travel. The application 197 may then transmit this information to the system 100, and the system returns to the application the predicted experienced travel time for the specified origin/destination (OD) pair at a plurality of future departure time intervals. The time intervals may be 15 minute, 30 minute, or other time intervals.

For each departure time window, the system 100 provides one or more (e.g., one to three, or the like) different routes traveling through distinct freeways or arterials. For each provided route, a set of available incentives may be provided, and where the incentive may vary among both the route and the departure time options. Generally, an incentive is the discount or coupon provided by an entity (e.g., retailers, service providers, manufactures, municipalities, etc.). Using his or her mobile device 196, the user can examine the provided route(s), the predicted experience travel times, as well as the offered incentives and make a reservation for that incentive by agreeing to depart at the specified departure time window and to take the route associated with that incentive. The agreed travel selection and route (or a sufficiently validating portion thereof) should be successfully completed by the user in order for the system 100 to grant the user the previously agreed upon incentive.

The system 100 has a two-step method to verify the travel completion by the user. As discussed further below, shortly prior to the reserved departure time window, the mobile device application 197 executed on the user's mobile device 196 starts to communicate with GPS satellites 198. When the user becomes en route, the mobile device 196 uses two methods to verify that the user has entered the reserved route at the reserved departure time window. In some embodiments, the mobile device application 197 compares the GPS location data with the route data stored in the mobile device 196 during the reservation process. Additionally, upon user agreement, the mobile device application 197 may transmit the GPS data to the system 100. If the user enters the agreed upon route within the agreed upon time window, the first step of the verification process is completed. The mobile device application 197 then continues to either perform internal checking or communicate with the system 100 as the user travels along the journey. Once the system 100 verifies that the user has successfully completed at least a sufficiently validating portion (but not necessarily all) of the reserved route, then the second validation step is completed.

A user needs to successfully pass the first and second validation steps in order to have the previously made reservation considered fully validated by the system 100. After validating the completion of the sufficiently validating portion of the reserved route, the system 100 may then transmit the agreed upon incentive to the user's account via the user's designated email address, via the mobile device application 197, or the like. The incentive can then be redeemed according to instructions given to the user. Additional details regarding the possible incentive offerings are discussed below.

Referring still to FIGS. 1A and 1B, the system 100 includes a plurality of algorithms or sub-modules for implementing its functionality. Each of these sub-modules is described in detail below. It will be appreciated that one or more of these sub-modules may be logically or physically combined in one or more ways, and the modules and other components may be operative to communicate with each other as needed to implement the functionality described herein. Further, some embodiments may include all of the sub-modules or a subset of the sub-modules.

The system 100 includes a data-mining engine 120 that is operative to receive and analyze historical traffic data and to prepare data in a format that is suitable for real-time queries, data processing, and path calculations. In some embodiments, historical traffic data comes in a format of average speed by 15-minute bins for each link segment (e.g., a segment of roadway between of defined points) of a roadway for each day over a historical period (e.g., the past year, past five years, etc.). The data may also include numbers of vehicles traveling on particular roadways. This raw historical data is processed to extract the statistical attributes of the time-varying travel times (e.g. mean, standard deviation, etc.). Due to possible seasonal factors of traffic, noise data for the prediction of travel times of a given day (e.g., the fifth Friday of September, a particular holiday, etc.) may be filtered out in order to improve the prediction accuracy. Moreover, a variable temporal discretization scheme may be applied in order to reduce data storage requirements while increasing accuracy of the path calculation, as described below.

The data-mining engine 120 also includes a capacity discovery algorithm operative to determine the available capacity of roadway segments using the incoming traffic speed data. The capacity discovery algorithm estimates the available capacity for each roadway by link segment and by time. An available capacity index (ACI) is defined and calculated for each link segment that estimates the residual capacity between the current traffic flow condition (using real-time data) and a link segment's theoretical capacity. The ACI index is saved for each link segment to be used by the algorithm described below.

The system 100 also includes an online user transaction execution engine (TEE) 130 that comprises several sub-modules or algorithms, including an experienced travel time prediction algorithm 132, an M-time-dependent minimal marginal cost path algorithm 136 (or "route determination module"), an incentive offering algorithm 140, a spatio-temporal load balancing algorithm 144, and an incentive generation and bookkeeping algorithm 148. Each of these sub-modules of the TEE 130 is discussed below.

The experienced travel time prediction algorithm 132 of the TEE 130 is first described. When a user enters an OD pair via the mobile device 196, the mobile device application 197 transmits this OD information to the TEE 130, block 190. The TEE 130 uses the experienced travel time prediction algorithm 132 to return the predicted experienced travel time 180 between the OD pair for a plurality of future departure time windows over one or more routes. The experienced travel time generally means the predicted time that the user will experience when departing at a specific departure time window for each of the one or more routes. Since future conditions need to be considered for each departure time window, the prediction algorithm 132 utilizes both historical travel time data 124 and real-time data 122 as inputs for its model. The weight given to each of the historical travel time data 124 and the real-time data 122 may vary dependent on one or more factors, such as the amount of time into the future the prediction algorithm 132 is estimating travel times. For example, the real-time data 124 may become more relevant as the intended travel times become close in time to when the predictions are made. In some embodiments, the real-time data 122 and/or historical data 124 may be provided by a third party provider, such as INRIX, Inc., TomTom, Int'l, Traffic- .com, or the like.

When a user browses and/or selects an intended departure time, one or more routes ("M routes") 184 are produced by the M-time-dependent minimal marginal cost path algorithm 136 and displayed on the user's mobile device 196. This algorithm 136 calculates a total of M routes for the OD pair and departure times that are minimal marginal cost routes. The concept of marginal cost is the unit increase of travel time when one additional unit of flow is added to the route. Thus, the route with minimal marginal cost means that once a user is assigned to that route, the incremental cost to all existing users of that route is minimal. This calculation ensures that the user's travel causes the minimal cost to the selected route. The best M minimal marginal cost routes are computed by the algorithm 136, where M is a system-specified parameter. As an example, M may be set to three, as much more than three routes could be confusing to the user. In other embodiments, M may be set to a value less than or greater than three.

The incentive offering algorithm 140 is configured to select a set of suitable incentives 188 and to present them to the user via the mobile device application 197. Each incentive 188 may be associated with a given departure time and route. In other words, when a user selects a departure time window and a route, block 192, the set of incentives presented to the user may vary if the user selects different departure times and/or different routes. The incentive offering algorithm 140 provides incentives with a higher value to the user for departure times and routes that are more beneficial to the traffic congestion management goals. The incentive offering algorithm 140 may also call the spatio-temporal load balancing algorithm 144, described below, to account for the previously made reservations that have a departure time prior to the user's departure time in order to adjust the loading of traffic flow in order to preventing overloading the traffic network due to users of the system 100.

In some embodiments, the incentive offering algorithm 140 may also associate the incentive offering with the user's preferences or life style information 172 stored by the system 100. This can be done by (1) asking for the user's life-style information during the user registration process, block 176, and/or (2) partnering with other vendors (e.g., Amazon®, etc.) to understand the user's preferences or "wish lists" in order to provide more targeted and attractive incentives or coupons.

Figure 2A:
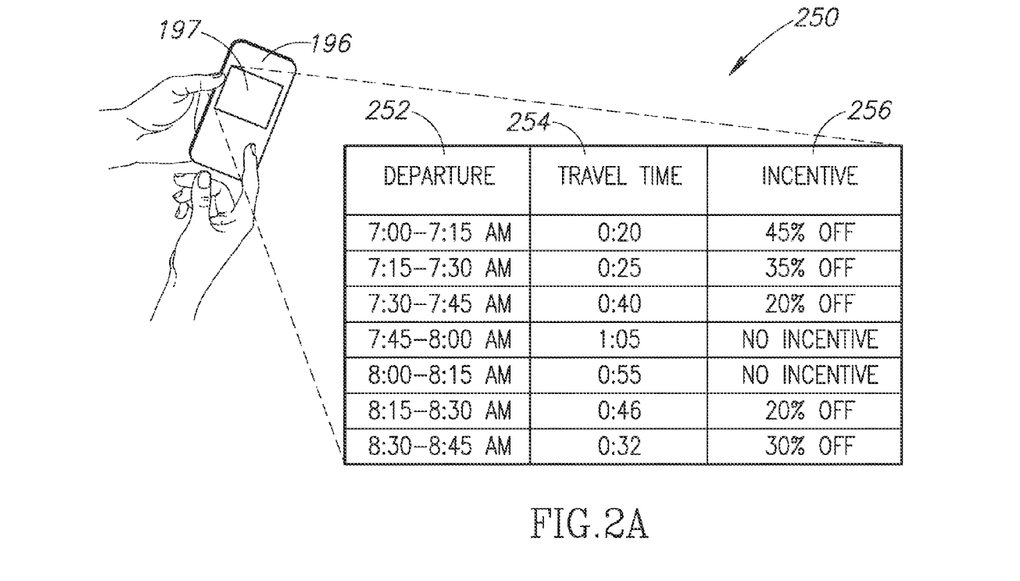
FIG. 2A depicts a departure time selection display screen of a mobile device executing a mobile device application of the active traffic and demand management system shown in FIGS. 1A and 1B.

An example embodiment of a departure time selection screen display 250 of the mobile device application 197 executing on the mobile device 196 is shown in FIG. 2A. As shown, the user is provided with a list of departure time windows 252, estimated travel times 254 for each of the departure time windows for a prior-selected route(s), and offered incentives 256 for each of the departure time windows. The estimated travel times 254 may comprise an average, minimum, or other statistical measure of multiple routes (e.g., three routes). In this example, the longest travel times (i.e., the most congested times) occur during the departure time windows 252 of 7:45-8:00 AM and 8:00-8:15 AM. Thus, no incentives are offered during these departure time windows 252. Further, as the estimated travel times 254 decrease (i.e., the less congested times), greater incentives 256 are offered to the user in an attempt to entice the user to travel at these less congested times, thereby improving the overall traffic flow of the selected route. It should be appreciated that in some embodiments the user may be able to select among a variety of combinations varying with regard to departure time windows, routes, and incentives.

Figure 2B:
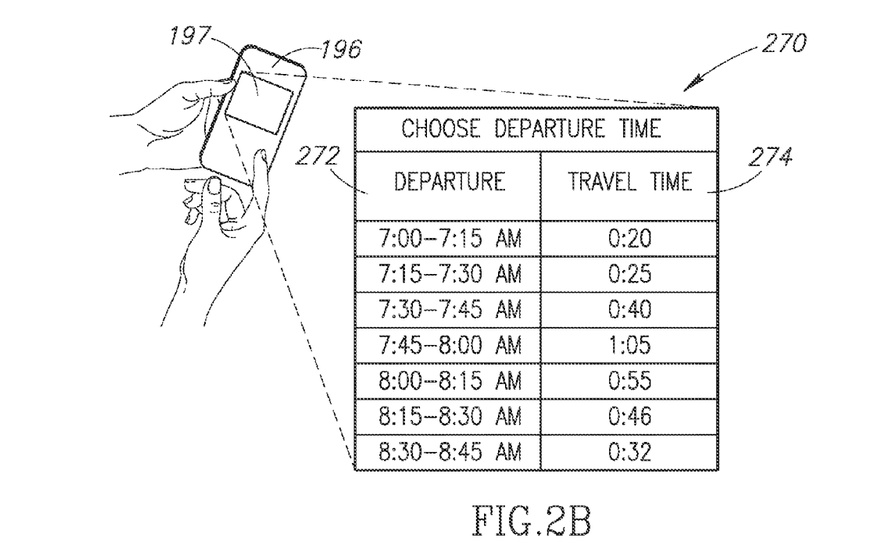
FIG. 2B depicts another embodiment of a departure time selection display screen of the mobile application.
Figure 2C:
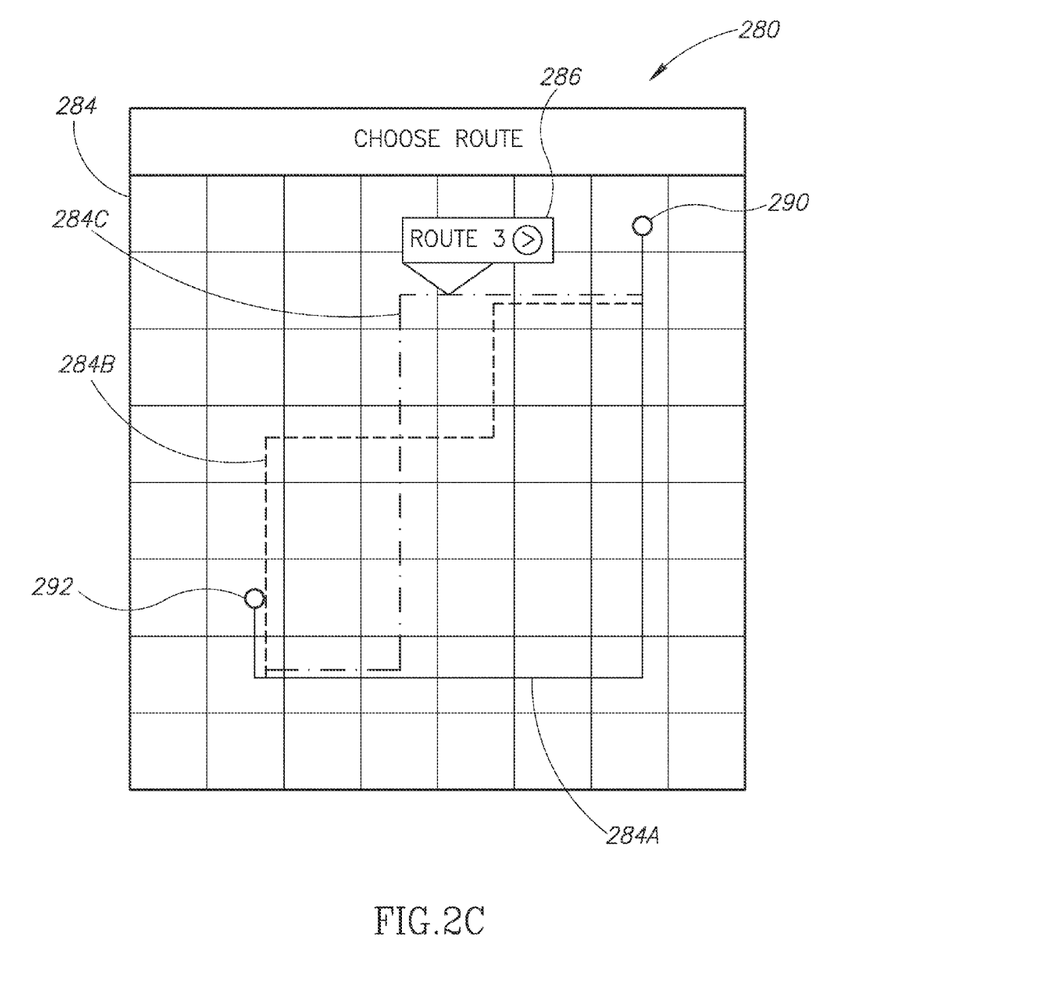
FIG. 2C depicts a route selection display screen of the mobile application.
Figure 2D:
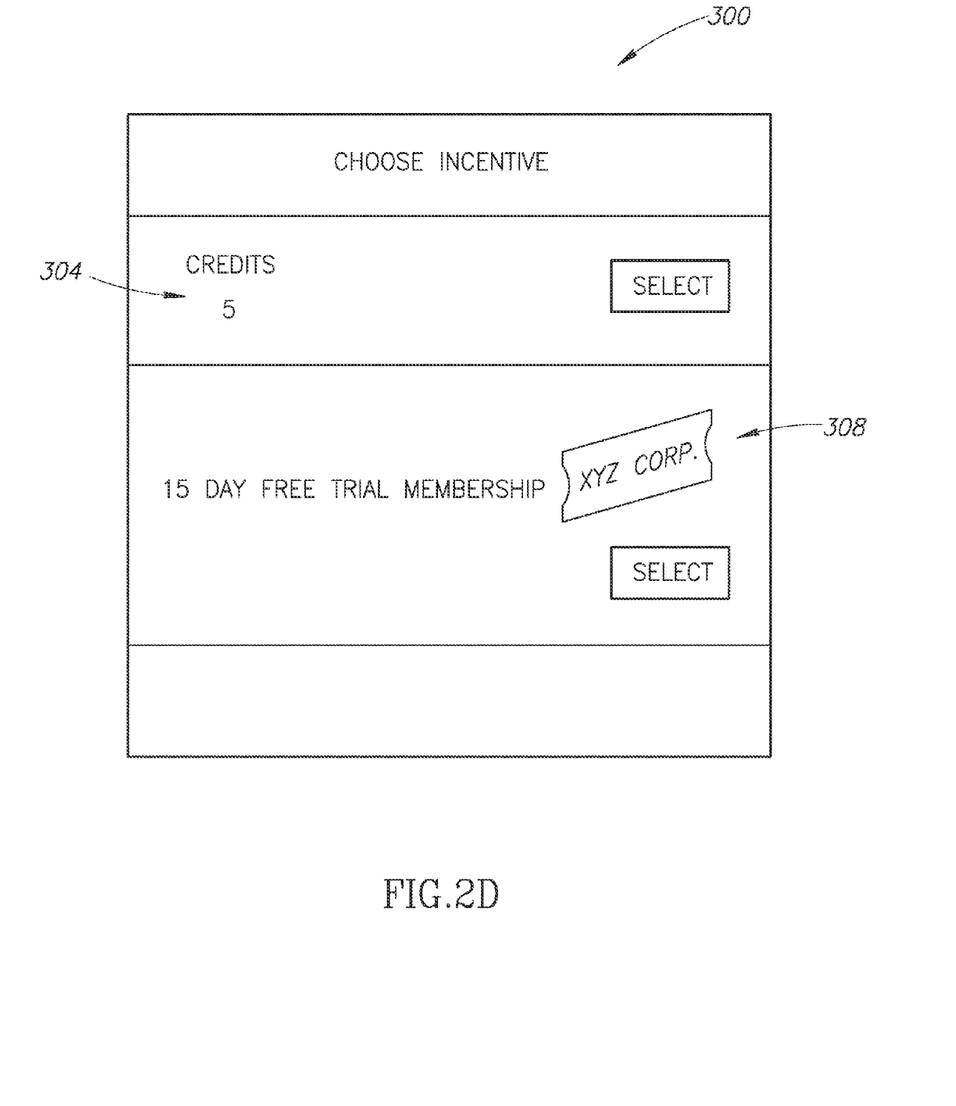
FIG. 2D depicts an incentive selection display screen of the mobile application.

FIGS. 2B, 2C, and 2D illustrates sequential screen displays 270, 280, and 300, respectively, of the mobile device application 197 executing on the mobile device 196 which illustrate another embodiment for allowing a user to select a departure time, route, and incentive. FIG. 2B illustrates a departure time selection screen 270 that provides the user with a list of departure time windows 272 and estimated travel times 274. As discussed above, the estimated travel times 274 may comprise an average, minimum, or other statistical measure of multiple routes.

Once the user has selected a departure time window, a route selection display screen 280 may be provided to the user, as shown in FIG. 2C. In this illustrated embodiment, the route selection display screen 280 includes three routes 284A-284C for the user to travel between an origin location 292 and a destination location 290. In response to the user touching or otherwise activating one of the routes 284A-C, a window 286 may pop-up that allows the user to select the activated or "highlighted" route. In this example, the user has selected Route 3 (or route 284C).

After the user has selected a particular route, an incentive selection screen 300 may be displayed, as shown in FIG. 2D. The incentive selection screen 300 may provide the user with one or more options for selecting credits 304, coupons 308, or other incentives for a variety of products, services, account enhancement features, etc., as discussed above.

A purpose of the spatio-temporal load balancing algorithm 144 is to avoid assigning too much traffic to the same departure time window and/or route so that a particular departure time/route is not overloaded. Because the incentives are offered for each user at different times for various future departure times, a reservation made by a user at a given time needs to consider all previously made reservations with departure times prior to the current user's considered departure time. This is because trips departing earlier using the same route may impact the trips departing at later times. Similarly, the current user can affect previously made reservations with later departure times. In this case, the spatio-temporal load balancing algorithm 144 can calculate and track the predicted travel times to make sure that the previously reserved departure times/routes are not severely impacted by later user reservations.

The incentive generation and bookkeeping module or algorithm 148 of the TEE 130 is now described. Once a user makes a reservation for an incentive by agreeing to depart at a specific departure time window and taking a certain route, block 192, this reservation is stored by the TEE 130 and is labeled as being "active." The reservation may be changed to other statuses, such as "completed" if the user completes the route as agreed upon, or "failed" if the user fails to complete travel as promised. The transaction status data may be stored and analyzed to better understand the behaviors and/or preferences of each user. The incentive generation and bookkeeping algorithm 148 also ensures that the offered incentives are valid according to the contract agreements with the incentive providers.

As shown in FIG. 1B, the system 100 also includes an online roadway condition monitoring and user alert module 150. In the event an unscheduled work zone or an unexpected accident occurs on the traffic network, and this event is not known to the system 100 at the time a user reservation is made, the user alert module 150 will notify the user if the system 100 determines that (1) this incident will severely affect the user's travel time on the selected route, and/or (2) the user sets a preference in his or her user profile 172 to receive real-time alerts for incidents that may affect him or her.

In this case, the roadway condition monitoring and user alert module 150 may regularly send an inquiry to the real-time network condition data provider 122 for the real-time network condition data so that new incident events may be identified. The user alert module 150 may then be called and regularly scan existing reservations and update the travel times for each of the routes associated with existing reservations. If the increased travel times exceed a certain threshold, then the user alert module 150 may trigger the notification process to enable to user to (1) reevaluate the route for the same departure time, or (2) reevaluate one or more new departure times and routes. The user can then choose to keep the previously agreed upon incentive and route and departure time window or to select a new incentive for a newly selected departure time and route.

The system 100 further includes an online validation engine (VLE) 152. As can be appreciated, a previously agreed upon travel needs to be validated in order for system 100 to grant the user the reserved incentive. To accomplish this, a two-step validation process may be used. Shortly prior to the user's scheduled departure time, the mobile device application 197 starts to communicate with GPS satellites 198. When the user becomes en route, the mobile device 196 uses two methods to verify that the user has entered the reserved route at the reserved departure time window. As discussed above, in some embodiments, the mobile device application 197 compares the GPS location data with the route data stored in the mobile device 196 during the reservation process. Additionally, upon user agreement, the mobile device application 197 may transmit the GPS data to the system 100. If the user enters the agreed upon route within the agreed upon time window, the first step of the verification process is completed. The mobile device application 197 then continues to either perform internal checking or communicate with the system 100 as the user travels along the journey. Once the system 100 verifies that the user has successfully completed at least a sufficiently validating portion (but not necessarily all) of the reserved route, then the second validation step is completed. Otherwise, if the user has not completed at least a sufficiently validating portion of the reserved route, the VLE 152 marks the reservation to have a final status of "invalidated."

After the first validation step, the user needs to continue following the pre-planned route as the VLE 152 is analyzing the received GPS locational data. If the user successfully completes a sufficiently validating portion of the pre-planned route, then the VLE 152 considers the second step validation completed. The VLE 152 considers a reservation to be fully validated only if both the first and second validation steps are completed by the user.

Another advantageous use of the data from the VLE 152 is to validate the predicted travel time accuracy by recording the actual experienced travel time for a user and comparing it with the previously calculated predicted travel time. Such information may be used as the input to a link segment travel time update engine 156, described below.

The mobile device application 197 may display the route during the validation process as the user is traveling. In some embodiments, the mobile device application 197 is operative to provide turn-by-turn audio and/or visual guidance to help guide the user to follow the selected route between the origin and destination.

The link segment travel time update engine ("STU") 156 is operative to record and merge the experienced link segment travel time with the historical link travel time data in order to update the estimated link travel times. In some embodiments, this is done using Bayesian updating methods. In some embodiments, the current experienced travel time information may also be used as part of a historical travel time data set 124 for future estimation calculations by the system 100.

The system 100 also includes a vendor transaction engine and accounting database ("VTE") 160 that tracks how many types and the number of coupons that have been generated by the system. Each coupon has its own attributes and is stored as a database record in the VTE 160. During each transaction reconciliation period, the VTE 160 may validate its records with a coupon vendor's transaction database. For franchise vendors, the coupon transactions may be automatically recorded and processed in the franchise's accounting system. The accounting system's records may be compared and reconciled with the VTE 160, wherein used and expired coupons may be voided.

Revenue due to used coupons may be processed to produce accounts receivable information. For typical merchants without a pre-existing coupon transaction accounting mechanism, the system 100 also provides a website for the merchants to enter coupon codes and transaction amounts when coupons are redeemed. This step voids the used coupons and transmits the transaction amounts record to the VTE 160. The aforementioned processes use retailer coupons as an example for the operation of the VTE 160, but it should be appreciated that the operation of the VTE 160 may be configured to accommodate other types of incentives.

The system 100 also includes a user behavior analysis engine (UBA) 164. The status of each reservation is recorded and analyzed by the UBA 164. The analysis focuses on understanding how frequent a registered user makes a reservation, how frequently he or she fully validates the reservation, and how frequently he or she starts a trip and attempts to validate a reservation but fails to have the reservation validated. Possible reasons for failing to validate the reservation could be due to traffic congestion prior to entering the agreed route and/or diversion from the agreed route due to unknown reasons. The UBA 164 may also be operative to periodically send out surveys to users to better understand their experience by collecting their feedback.

The analysis pertaining to coupon transactions focuses on how frequently a user would use a reserved coupon and the average transaction amount, grouped, for example, by sociodemographic attributes. The UBA 164 may also try to understand and analyze the types of coupons that different users select based on their preference and/or life style information 172. Based on this information 172, marketing staff of the system 100 are able to have a better idea of what types of incentives are more desirable by users. Thus, a marketing campaign can be designed and incentives can be selected accordingly.

User experience feedback may be an important component to the collection of user information 172 as the basis for functionality improvements for the system 100. User feedback information 172 may be collected from the system's web application 195 as well as the system's mobile device application 197 through a "send feedback" function on the respective platform.

As shown in FIG. 1A, the system 100 also includes a marketing intelligence engine (MIE) 170. The MIE 170 is operative to allow marketing staff to query and receive analysis results produced by the UBA 164 to assist in the design and execution of marketing campaigns. Typical questions marketing staff may ask include:
 types of coupons/incentives most selected by personal attributes, time, OD pairs, or cities;
 reservation frequency by city, corridor, origin, destination, or departure time;
 coupon use characteristics by city, corridor, origin, destination, and/or personal attributes; and
 any user feedback data collected by the website application 195 or the mobile device application 197.

Figure 3:
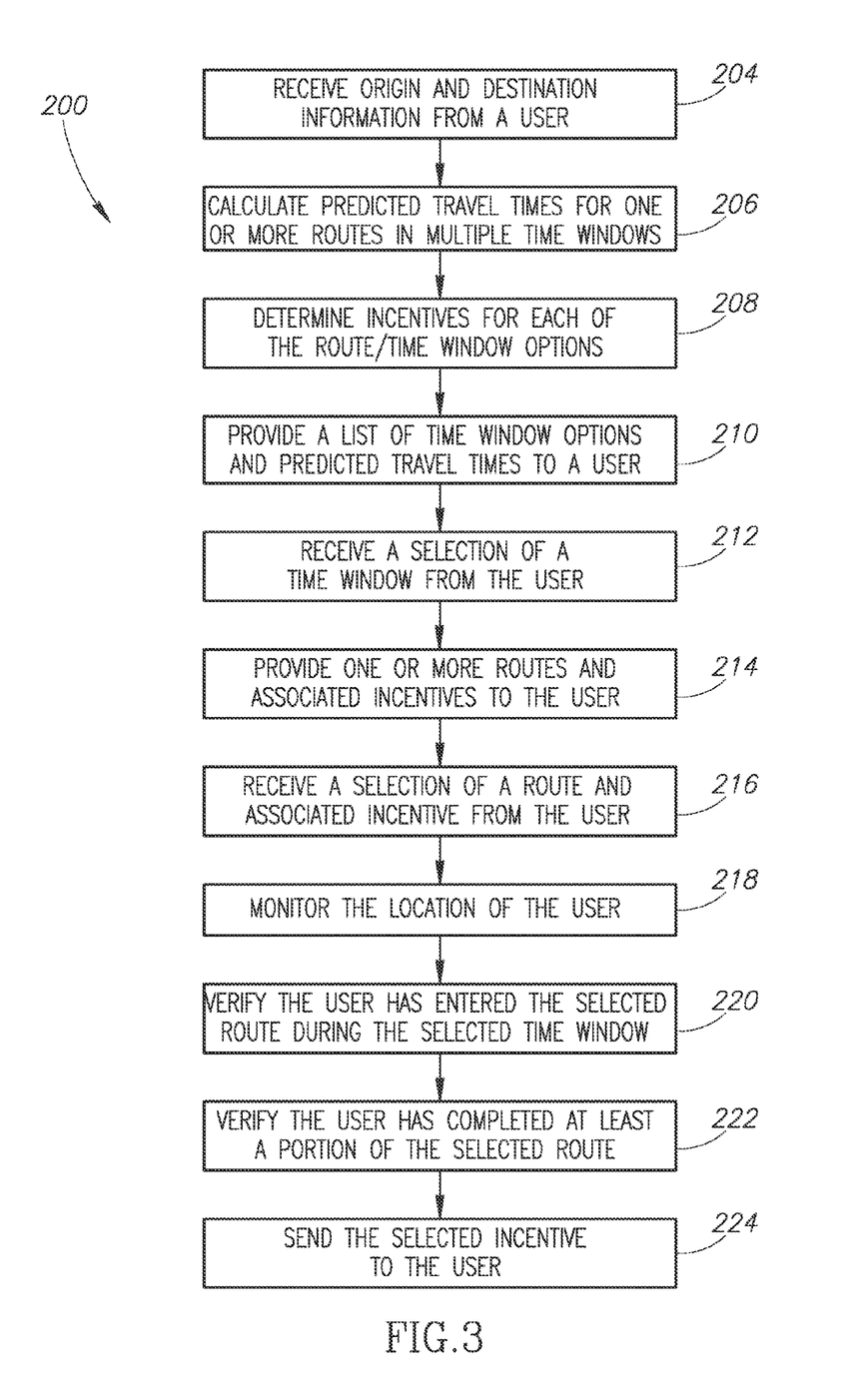
FIG. 3 depicts a flow chart of an exemplary process for implementing the active traffic and demand management system shown in FIGS. 1A and 1B.

FIG. 3 depicts a flow chart of an exemplary process 200 for implementing the active traffic and demand management system 100 shown in FIGS. 1A and 1B and described above. The specific implementation of each of the steps in the process 200 is described in detail above. The process 200 begins by receiving origin and destination information and a preferred travel time from a user via the mobile device application 197 executing on the user's mobile device 196, step 204. The system 100 then calculates predicted travel times for one or more routes in a plurality of departure time windows, step 206. The system 100 also determines incentives to offer to the user for one or more routes and multiple departure time windows, step 208. Next, the system 100 sends a list of departure time window options and estimated travel times to the mobile device application 197 for display on the user's mobile device 196, step 210.

The system then receives a selection of a time window from the user, step 212, and in response, provides one or more routes and associated incentives to the user, step 214. As discussed above, the departure times, routes, and incentives may be presented to the user sequentially, simultaneously, or any combination thereof. The system 100 then receives a selection of a route and incentive from the user, step 216. Near the selected departure time window, user's mobile device 196 may utilize the route information and GPS location information to monitor the location of the user. Additionally or alternatively, upon user agreement, the system 100 may monitor the location of the user by receiving GPS location signals from the user's mobile device 196, and verifies that the user has entered the beginning of the selected route during the selected departure time window, steps 218 and 220. As the user travels along the route, the mobile application 197 (or system 100) verifies that the user has completed at least a sufficiently validating portion of the selected route, step 222. For example, the application 197 or system 100 may ensure that the user passes through a portion of the route known to have the most congestion (e.g., a tunnel, a bridge, a city, etc.) before considering the route to have been validly completed. Once it has verified the user has completed the specified portion of the route, the system 100 may then provide the agreed upon incentive to the user, step 224.

Figure 4:
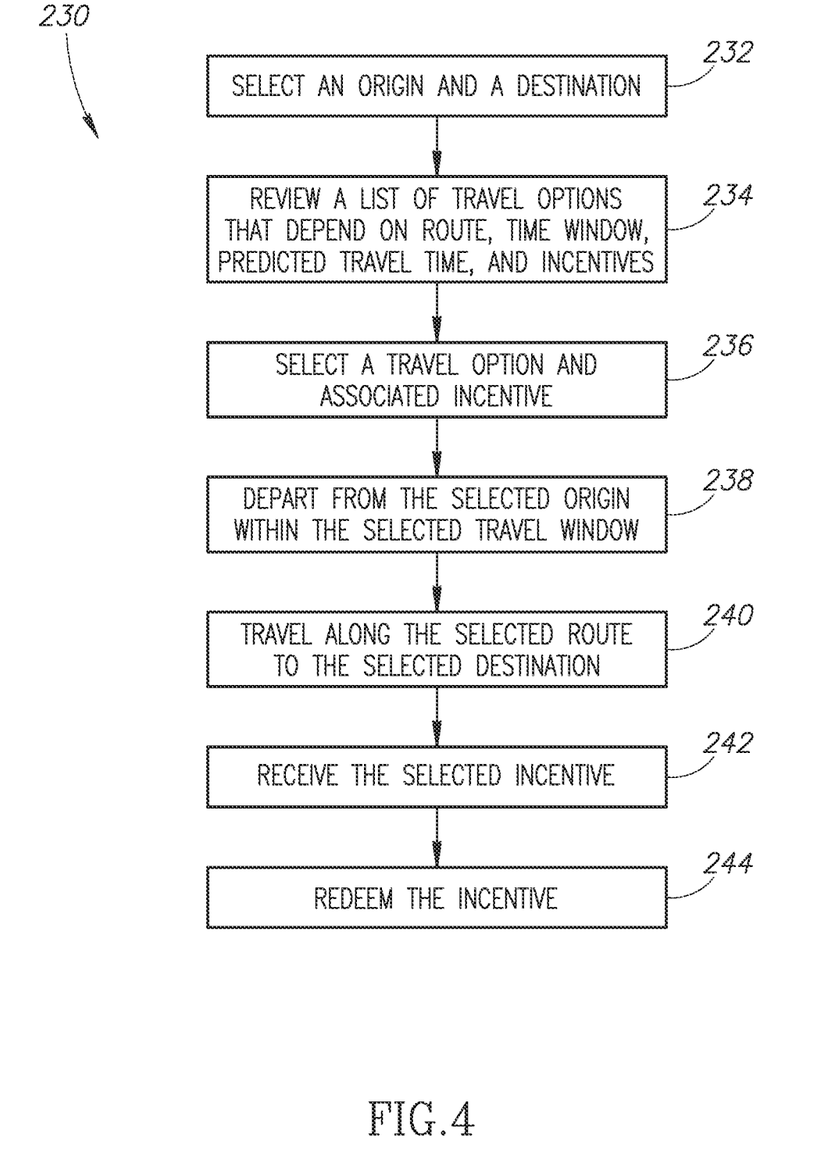
FIG. 4 depicts a flow chart of an exemplary process for using the active traffic and demand management system shown in FIGS. 1A and 1B.

FIG. 4 depicts a flow chart of an exemplary process 230 for using the active traffic and demand management system 100 shown in FIGS. 1A and 1B and described above. Initially, the user may select an origin and a destination for an intended trip using the mobile device application 197, step 232. Then, the user may review a list of travel options received from the system 100 that provide various routes, departure time windows, predicted travel times, and incentives, step 234. The user may select a specific travel option and its associated incentive offered for traveling according to the parameters of the selected travel option, step 236.

The user may then depart from the selected origin with the selected departure time window and travel along the selected route to the selected destination, steps 238 and 240. Once the user has reached the selected destination (or has traveled on a sufficient portion of the route) according to the selected travel option, the user receives the selected incentive from the system and may then redeem the incentive, steps 242 and 244.

Although the examples provided above are in the context of managing vehicular traffic on roadways, it should be appreciated that the concepts of the present invention may be used in numerous applications to manage the flow of traffic (e.g., pedestrian traffic, vehicular traffic, etc.) in situations where congestion may be present. For example, the present invention may be used to manage congestion of a parking lot or multiple parking lots by providing users with incentives for traveling to the parking lot(s) and/or exiting the parking lot(s) at agreed upon times. Similarly, the systems described herein may be used to manage the flow of pedestrian traffic at various venues, such as sporting events, carnivals, concerts, public events (e.g., parades), and the like. In these examples, attendees of an event may be given incentives to arrive at or depart from a venue during certain time windows that are selected to minimize the congestion at the venue. Those skilled in the art will readily recognize other applications in which the systems of the present invention may be utilized.

It should be appreciated that the embodiments of the present invention provide several advantages. By reducing traffic congestion, the systems and methods described herein will directly result in increased fuel efficiency and reduced emissions from vehicles caused by excessively congested roadways. Further, rather than penalizing the use of popular roadways during peak times, the embodiments described above use positive incentives to encourage users to choose alternative departure time windows. It is well known that some trips are flexible regarding departure times, and using incentives to entice users to take alternative departure times to alleviate congestion is a "win-win" strategy that benefits both individual users as well as society.

The systems presented herein will be advantageous to users, vendors, public agencies, and politicians because the systems are based on the concept of rewarding good deeds. The costs to government agencies are minimal because the systems can be operated primarily by private entities while providing a positive effect for the public at large. Those skilled in the art will readily recognize these and other advantages of the embodiments described herein.

Computing System

FIG. 5 is a diagram of hardware and an operating environment in conjunction with which implementations of the active traffic demand and management system 100 may be practiced. The description of FIG. 5 is intended to provide a brief, general description of suitable computer hardware and a suitable computing environment in which implementations may be practiced. Although not required, implementations are described in the general context of computer-executable instructions, such as program modules, being executed by a computer, such as a personal computer or the like. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, cloud computing architectures, and the like. Implementations may also be practiced in distributed computing environments where tasks are performed by remote processing devices that are linked through one or more communications networks. In a distributed computing environment, program modules may be located in both local and remote memory storage devices.

The exemplary hardware and operating environment of FIG. 5 includes a general-purpose computing device in the form of a computing device 12. The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, a mobile computing device, or any other type of computing device.

The system bus 23 may be any of several types of bus structures including a memory bus or memory controller, a peripheral bus, and a local bus using any of a variety of bus architectures. The system memory 22 may also be referred to as simply the memory, and may include read only memory (ROM) 24 and random access memory (RAM) 25. A basic input/output system (BIOS) 26, containing the basic routines that help to transfer information between elements within the computing device 12, such as during start-up, may be stored in ROM 24. The computing device 12 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media. The computing device 12 may also include one or more other types of memory devices (e.g., flash memory storage devices, and the like).

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37 (e.g., one or more of the modules and applications described above), and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, a universal serial bus (USB), or the like. A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 9 include a local-area network (LAN) 51 and a wide-area network (WAN) 52.

Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A computer implemented method for managing the flow of traffic, comprising:

receiving an origin and destination location pair and a preferred travel time from a user;

determining a route between the origin and the destination;

determining multiple departure time windows proximate in time to the preferred travel time, wherein each of the departure time windows corresponds to a time interval when the user is to depart from the origin and travel along the route toward the destination;

determining a user incentive for each of the multiple departure time windows, wherein determining a user incentive comprises dynamically adjusting the incentives allocation based on historical data, real-time data, and existing selections of departure time windows for other users;

sending the route, the multiple departure time windows and their associated incentives for display;

receiving from the user a selection of the route and one of the departure time windows and its associated incentive;

receiving location information from the user during the user's travel along at least a portion of the route;

verifying that the user has departed from the origin during the selected departure time window and traveled along at least a portion of the route thereafter; and sending the incentive to the user.

2. The method of claim 1, further comprising calculating predicted travel times between the origin and destination pair for each of the multiple departure time windows.

3. The method of claim 2, wherein calculating predicted travel times comprises analyzing historical data and real-time traffic data for the route.

4. The method of claim 1, wherein determining a route between the origin and destination pair and determining multiple departure time windows comprise taking into consideration previous selections of routes and departure travel times made by other users.

5. The method of claim 1, wherein determining a user incentive comprises predicting the departure time windows that would result in the least amount of impact to the route's congestion.

6. The method of claim 5, wherein determining a user incentive further comprises taking into consideration the time difference between each of the multiple departure time windows and the preferred travel time.

7. The method of claim 1, wherein determining a user incentive further comprises taking into consideration the user's preferences or life style information.

8. The method of claim 1, wherein receiving location information comprises receiving global positioning system (GPS) location data from a mobile device of the user.

9. The method of claim 8, wherein verifying that the user has departed from the origin during the selected departure time window and traveled along at least a portion of the route thereafter comprises analyzing the received GPS location data to verify that the user has entered a location proximate to the origin during the selected departure time window, and to verify that the user has successfully completed at least a predetermined portion of the selected route.

10. The method of claim 1, wherein sending the incentive to the user comprises sending an email to a designated email address of the user.

11. The method of claim 1, wherein determining a route comprises calculating multiple routes between the origin and destination at the multiple departure time windows.

12. The method of claim 1, wherein determining a route comprises calculating one or more routes between the origin and destination at the multiple departure time windows taking into consideration the unit increase of travel time when one additional unit of flow is added to a route.

13. The method of claim 1, further comprising identifying an unscheduled incident on the route, and sending a message to the user providing a notification of the incident.

14. The method of claim 13, further comprising providing an alternate route for the user, and receiving a selection of the alternate route from the user.

15. The method of claim 1, further comprising analyzing behavioral information received from the user and modifying the incentives offered to the user based on the analyzed behavioral information.

16. A non-transitory computer readable medium having stored thereon computer-executable instructions for performing a procedure to manage the flow of traffic, the procedure comprising:
- receiving an origin and destination location pair and a preferred travel time from a user;
- determining a route between the origin and the destination;
- determining multiple departure time windows proximate in time to the preferred travel time, wherein each of the departure time windows corresponds to a time interval when the user is to depart from the origin and travel along the route toward the destination;
- determining a user incentive for each of the multiple departure time windows, wherein determining a user incentive comprises dynamically adjusting the incentives allocation based on historical data, real-time data, and existing selections of departure time windows for other users;
- sending the route, the multiple departure time windows and their associated incentives for display;
- receiving from the user a selection of the route and one of the departure time windows and its associated incentive;
- receiving location information from the user during the user's travel along at least a portion of the route;
- verifying that the user has departed from the origin during the selected departure time window and traveled along at least a portion of the route thereafter; and
- sending the incentive to the user.

17. The medium of claim 16, wherein receiving location information comprises receiving global positioning system (GPS) location data from a mobile device of the user.

18. The medium of claim 17, wherein verifying that the user has departed from the origin during the selected departure time window and traveled along at least a portion of the route thereafter comprises analyzing the received GPS location data to verify that the user has entered a location proximate to the origin during the selected departure time window, and to verify that the user has successfully completed at least a predetermined portion of the selected route.

19. A computer implemented method for managing the flow of traffic, comprising:
- receiving an origin and destination location pair and a preferred travel time from a user;
- determining a route between the origin and the destination;
- determining multiple departure time windows proximate in time to the preferred travel time, wherein each of the departure time windows corresponds to a time interval when the user is to depart from the origin and travel along the route toward the destination;
- determining a user incentive for each of the multiple departure time windows;
- sending the route, the multiple departure time windows and their associated incentives for display;
- receiving from the user a selection of the route and one of the departure time windows and its associated incentive;
- receiving location information from the user during the user's travel along at least a portion of the route, wherein receiving location information comprises receiving global positioning system (GPS) location data from a mobile device of the user;
- verifying that the user has departed from the origin during the selected departure time window and traveled along at least a portion of the route thereafter, wherein verifying that the user has departed from the origin during the selected departure time window and traveled along at least a portion of the route thereafter comprises analyzing the received GPS location data to verify that the user has entered a location proximate to the origin during the selected departure time window, and to verify that the user has successfully completed at least a predetermined portion of the selected route; and
- sending the incentive to the user.

\* \* \* \* \*